(12) United States Patent
Kwak

(10) Patent No.: US 11,422,916 B2
(45) Date of Patent: Aug. 23, 2022

(54) USAGE AMOUNT MONITORING METHOD AND MONITORING UNIT OF ELECTRONIC CONTROL UNIT FOR VEHICLE

(71) Applicant: HYUNDAI AUTOEVER CORP., Seoul (KR)

(72) Inventor: Hwan Joo Kwak, Suwon-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 332 days.

(21) Appl. No.: 16/688,583

(22) Filed: Nov. 19, 2019

(65) Prior Publication Data
US 2020/0183809 A1    Jun. 11, 2020

(30) Foreign Application Priority Data

Dec. 10, 2018   (KR) .......................... 10-2018-0158081

(51) Int. Cl.
*G06F 11/34*      (2006.01)
*G06F 11/30*      (2006.01)
(Continued)

(52) U.S. Cl.
CPC ...... *G06F 11/3495* (2013.01); *G06F 11/3013* (2013.01); *G06F 11/3024* (2013.01);
(Continued)

(58) Field of Classification Search
CPC ............. G06F 11/3495; G06F 11/3013; G06F 11/3024; G06F 11/3065; G06F 12/023;
(Continued)

(56) References Cited

U.S. PATENT DOCUMENTS 5,564,015 A * 10/1996 Bunnell .............. G06F 11/3423
                                                        713/340
7,581,051 B2 * 8/2009 Talluri .................... G06F 13/24
                                                        710/260
(Continued)

FOREIGN PATENT DOCUMENTS

JP        2007065893 A      3/2007
JP        2017218081 A      12/2017
(Continued)

OTHER PUBLICATIONS

Notice of Allowance for KR 10-2018-0158081 dated Feb. 5, 2020 (5 pgs).

*Primary Examiner* — Matthew J Brophy
(74) *Attorney, Agent, or Firm* — Lempia Summerfield Katz LLC

(57) ABSTRACT

A usage amount monitoring method is provided. The method may include: recording a usage amount time that records a maximum usage amount of the central processing unit (CPU) by recording a start time and an end time of task and interrupt service routine (ISR); storing data in a non-volatile memory by obtaining the maximum usage amount of the CPU, an engine revolutions per minute (RPM), a software operating mode, a fault code, a number of tasks started, and a task response time; and transmitting relevant information that is delivered to an external communication such that the relevant information may be confirmed in a personal computer (PC) in a chronological order after storing a previous record in the chronological order when the maximum usage amount of the CPU is updated.

10 Claims, 4 Drawing Sheets

(51) Int. Cl.
  *G06F 12/02* (2006.01)
  *G07C 5/08* (2006.01)
(52) U.S. Cl.
  CPC ........ *G06F 11/3065* (2013.01); *G06F 12/023* (2013.01); *G07C 5/085* (2013.01); *G06F 2212/1044* (2013.01); *G06F 2212/173* (2013.01)
(58) Field of Classification Search
  CPC ....... G06F 2212/1044; G06F 2212/173; G06F 11/3409; G06F 11/3419; G06F 9/5022; G06F 11/30; G06F 2212/202; G07C 5/085; G05B 23/0218; B60R 16/0232
  See application file for complete search history.

(56) References Cited

U.S. PATENT DOCUMENTS

| | | | | |
|---|---|---|---|---|
| 8,136,157 | B2* | 3/2012 | Koyasu | G06F 8/60 |
| | | | | 726/22 |
| 9,152,525 | B2* | 10/2015 | Wada | G06F 11/3089 |
| 10,399,593 | B2* | 9/2019 | Naganathan | G06F 11/0754 |
| 10,514,976 | B2* | 12/2019 | Fox | G06F 8/658 |
| 10,545,814 | B2* | 1/2020 | Fox | G06F 11/079 |
| 10,759,444 | B2* | 9/2020 | Michalakis | G06F 9/5044 |
| 11,095,542 | B2* | 8/2021 | Ishizuka | H04L 43/0817 |
| 2005/0049736 | A1* | 3/2005 | Miyamoto | G06F 11/3447 |
| | | | | 714/E11.197 |
| 2008/0282248 | A1* | 11/2008 | Tokumochi | G06F 11/3466 |
| | | | | 718/102 |
| 2013/0304947 | A1* | 11/2013 | Wada | G06F 11/3048 |
| | | | | 710/18 |
| 2014/0047146 | A1* | 2/2014 | Nakagawa | G06F 11/3495 |
| | | | | 710/105 |
| 2014/0109096 | A1* | 4/2014 | Chandhoke | G06F 9/4825 |
| | | | | 718/102 |
| 2016/0283545 | A1* | 9/2016 | Benke | G06F 16/2282 |
| 2017/0243412 | A1* | 8/2017 | Deville | G06F 11/3013 |
| 2017/0361870 | A1* | 12/2017 | Naganathan | G06F 11/3452 |
| 2019/0009790 | A1* | 1/2019 | Michalakis | H04L 67/12 |
| 2019/0179626 | A1* | 6/2019 | Fox | G06F 12/0646 |
| 2019/0213001 | A1* | 7/2019 | Fox | G06F 16/188 |
| 2019/0230014 | A1* | 7/2019 | Ishizuka | H04L 41/046 |
| 2020/0110649 | A1* | 4/2020 | Fox | G06F 11/1433 |
| 2020/0226016 | A1* | 7/2020 | Fox | G06F 11/3612 |
| 2020/0319884 | A1* | 10/2020 | Rohleder | G06F 11/3466 |
| 2021/0074081 | A1* | 3/2021 | Saito | G07C 5/0808 |
| 2021/0263725 | A1* | 8/2021 | Fox | G06F 9/44521 |

FOREIGN PATENT DOCUMENTS

| | | |
|---|---|---|
| KR | 1020140078344 A | 6/2014 |
| KR | 101497232 B1 | 2/2015 |
| KR | 20160067479 A | 6/2016 |

\* cited by examiner

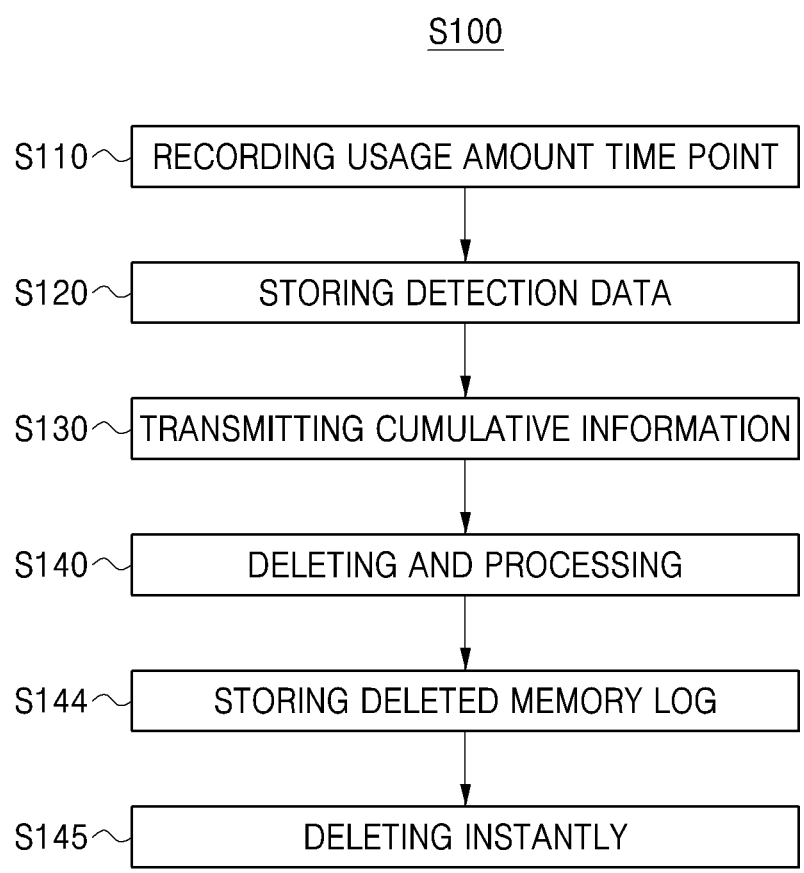

USAGE AMOUNT MONITORING METHOD AND MONITORING UNIT OF ELECTRONIC CONTROL UNIT FOR VEHICLE

CROSS-REFERENCE TO RELATED APPLICATION

This application claims priority to and the benefit of Korean Patent Application No. 10-2018-0158081, filed on Dec. 10, 2018, the entire contents of which are incorporated herein by reference in their entirety.

TECHNICAL FIELD

The present disclosure relates to a usage amount monitoring method and monitoring unit of an electronic control unit for a vehicle, and more particularly, to a usage amount monitoring method and monitoring unit of an electronic control unit for a vehicle, which may monitor the usage amount of a central processing unit mounted in an electronic control unit for a vehicle.

BACKGROUND

The statements in this section merely provide background information related to the present disclosure and may not constitute prior art.

Various Electronic Control Units (ECUs) in a vehicle are usually designed to have a single Central Processing Unit (CPU), but may also be designed to have two CPUs to enhance its operating performance. That is, two CPUs are mounted on a single board, and the two CPUs are connected by a bus line to be communicable with each other.

The number mounted of such CPUs is determined by the ECU designer's order, but in some cases, the ECU is also manufactured in a state where the two CPUs have been mounted even without the ECU designer's request. In this case, only one CPU performs a predetermined task, and the other CPU exists in a dummy form to perform no task or serves to monitor and assist the one CPU.

Meanwhile, the ECU designer needs to measure and calibrate a variable value processed in the CPU mounted in the electronic control unit for the vehicle, and to this end, the ECU designer usually collects the variable value processed in the CPU supporting a CAN Calibration Protocol (CCP) through a debugger device such as an ECU Measurement and Calibration Toolkit to measure and calibrate the variable value. This ECU Measurement and Calibration Toolkit may provide a high-level and easy-to-use function based on the CAN Calibration Protocol (CCP) to construct a measurement and calibration application customized for ECU designers, testers, and engineers.

Meanwhile, according to the related art, if the usage amount of the Central Processing Unit (CPU) mounted in the Electronic Control Unit (ECU) for the vehicle increases excessively, the time required for operation becomes insufficient and may cause an abnormal operation.

According to the related art, a technology of measuring the usage amount of the Central Processing Unit (CPU) has been developed, but there is no method for analyzing or solving the cause of the sharp increase in the usage amount of the central processing unit.

SUMMARY

The present disclosure provides a usage amount monitoring method and monitoring unit of an electronic control unit for a vehicle, which may monitor the usage amount of a central processing unit mounted in an electronic control unit for a vehicle.

A usage amount monitoring method of an electronic control unit for a vehicle according to one aspect of the present disclosure for achieving the object, as the method for monitoring the usage amount of a Central Processing Unit (CPU) mounted in the Electronic Control Unit (ECU) for the vehicle, may be a configuration of including a) recording a usage amount time point that records the maximum usage amount update moment of the central processing unit (CPU) through the execution time measuring function of each Task and Interrupt Service Routine (ISR) by recording the time information of a Task and ISR execution and end time point; b) storing detection data that stores them in a non-volatile memory by obtaining the maximum usage amount of the central processing unit (CPU), an engine RPM, a software operating mode, a fault code, the number executed of Tasks, and Task response time information; and c) transmitting cumulative information that delivers relevant information to external communication so that the corresponding information may be confirmed in a PC in chronological order after storing the previous record in chronological order at the moment that the maximum usage amount of the central processing unit (CPU) is updated.

In some forms of the present disclosure, the usage amount monitoring method of the electronic control unit for the vehicle may be a configuration of further including sorting a used memory that sorts software and data occupying the memory of the central processing unit sequentially according to an occupying memory capacity.

In this case, the usage amount monitoring method of the electronic control unit for the vehicle may be a configuration of further including detecting a current state of the used memory that detects whether the corresponding software or data is currently being used, is not being used after having been used in the past, or is expected to be used in the future, based on the data sorted sequentially from the sorting the used memory.

Further, the usage amount monitoring method of the electronic control unit for the vehicle may be a configuration of further including securing an available memory that deletes and processes the corresponding software or data according to a predetermined reference, based on the data detected from the detecting the current state of the used memory.

Further, the predetermined reference may be a reference of determining the level of an object to be deleted and processed, and may be a reference of determining whether to delete the memory that is not being used after having been used in the past, or to delete the memory that is expected to be used in the future.

At this time, the predetermined reference may be changed by a vehicle designer, a checker, or a user.

In some forms of the present disclosure, the usage amount monitoring method of the electronic control unit for the vehicle may be a configuration of further including deleting and processing that sorts software and data occupying the memory of the central processing unit sequentially according to an occupying memory capacity, then detects whether the corresponding software or data is currently being used, is not being used after having been used in the past, or is expected to be used in the future, and deletes and processes the corresponding software and data occupying the memory unnecessarily, based on the data stored from the storing the detection data.

In this case, the usage amount monitoring method of the electronic control unit for the vehicle may be a configuration of further including storing a deleted memory log that records the corresponding software and data information deleted and processed from the deleting and processing in chronological order.

Further, the usage amount monitoring method of the electronic control unit for the vehicle may be a configuration of further including deleting instantly that deletes and processes the information (corresponding software and data) of the corresponding memory instantly, if the corresponding software and data occupy the memory again, based on the data stored from the storing the deleted memory log.

Further, since the present disclosure may provide a monitoring unit operated by the usage amount monitoring method of the electronic control unit for the vehicle, a usage amount monitoring unit of an electronic control unit for a vehicle according to one aspect of the present disclosure may be a configuration of including a Task and ISR execution time measuring unit for recording the maximum usage amount update moment of a central processing unit (CPU) through the execution time measuring function of each Task and ISR by recording the time information of the Task and ISR execution and end time point; a software operation information obtaining unit for storing them in a non-volatile memory by obtaining the maximum usage amount of the central processing unit (CPU), an engine RPM, a software operating mode, a fault code, the number executed of Tasks, and Task response time information; and a central processing unit usage amount measuring unit for calculating the usage amount of the central processing unit based on the data obtained from the Task and ISR execution time measuring unit and the software operating information obtaining unit.

In some forms of the present disclosure, the usage amount monitoring unit of the electronic control unit for the vehicle may be a configuration of further including an information recording and reproducing unit for sorting software and data occupying a memory of the central processing unit according to an occupying memory capacity sequentially, then detecting whether the corresponding software or data is currently being used, is not being used after having been used in the past, or is expected to be used in the future, and deleting and processing the corresponding software and data occupying the memory unnecessarily, based on the data stored from the storing the detection data.

As described above, according to the usage amount monitoring method of the electronic control unit for the vehicle according to the present disclosure, it is possible to provide the usage amount monitoring method of the electronic control unit for the vehicle, which may include the recording the usage amount time point, the storing the detection data, and the transmitting the cumulative information of the specific configuration to monitor the usage amount of the central processing unit mounted in the electronic control unit for the vehicle, thereby implementing the optimal operating state.

Further, according to the usage amount monitoring method of the electronic control unit for the vehicle according to the present disclosure, it is possible to include the sorting the used memory, the detecting the current state of the used memory, and the securing the available memory, which perform the specific role, to delete the software or data that wastes the memory of the central processing unit unnecessarily to sufficiently secure the available memory capacity of the central processing unit, thereby significantly enhancing the response performance of the electronic control unit, and as a result, ensuring the safe control operation of the vehicle.

Further, according to usage amount monitoring method of the electronic control unit for the vehicle according to the present disclosure, it is possible to include the deleting and processing, the storing the deleted memory log, and the deleting instantly, which perform the specific role, to delete software or data that wastes the memory of the central processing unit unnecessarily to sufficiently secure the available memory capacity of the central processing unit, thereby significantly enhancing the response performance of the electronic control unit, and as a result, ensuring the safe control operation of the vehicle.

As described above, according to the usage amount monitoring unit of the electronic control unit for the vehicle according to the present disclosure, it is possible to provide the usage amount monitoring unit of the electronic control unit for the vehicle, which may include the Task and ISR execution time measuring unit, the software operation information obtaining unit, the central processing unit usage amount measuring unit, and the information recording and reproducing unit, which perform the specific role, to monitor the usage amount of the central processing unit mounted in the electronic control unit for the vehicle, thereby implementing the optimal operating state.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a flowchart illustrating a usage amount monitoring method of an electronic control unit for a vehicle in one form of the present disclosure.

Figure 1:
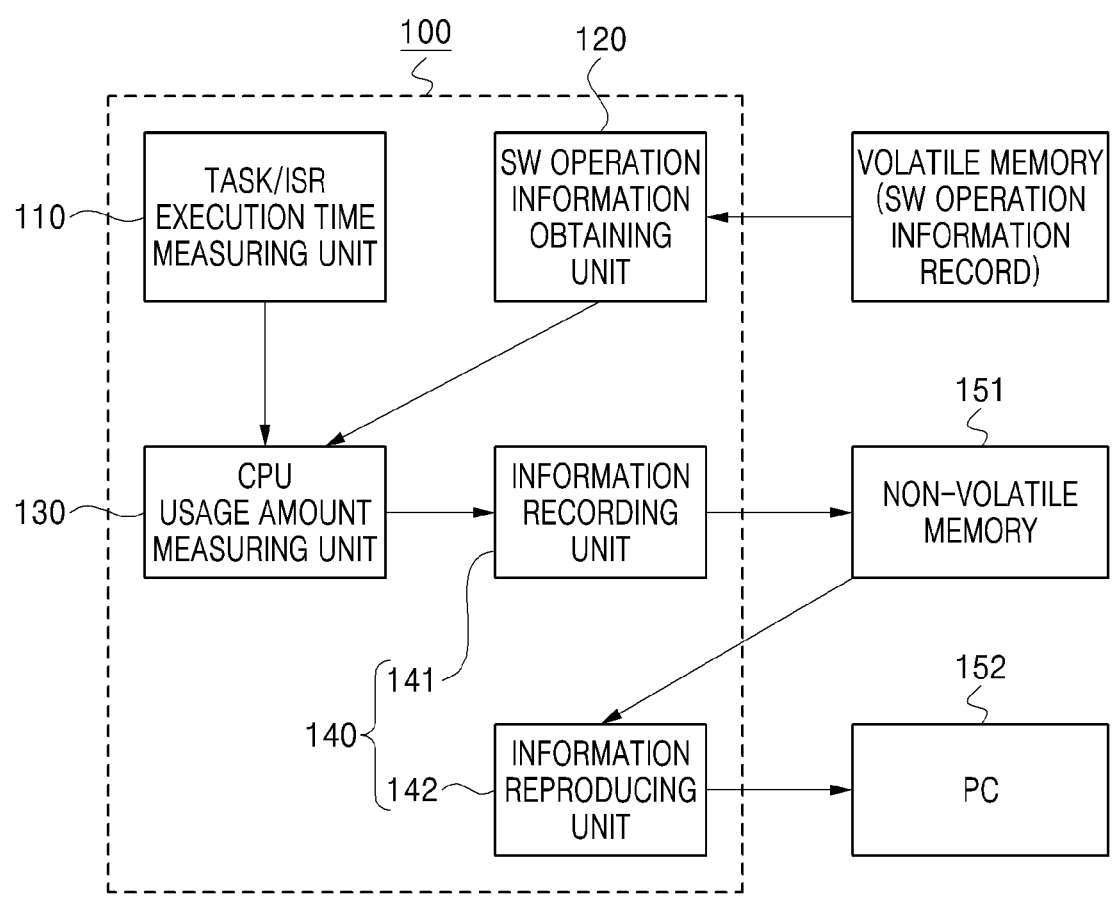
FIG. 1 is a block diagram illustrating a usage amount monitoring unit of an electronic control unit for a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Details of the object and technical configuration of the present disclosure and the operating effects thereby will be more clearly understood by the following detailed description based on the accompanying drawings of the specification of the present disclosure. Some forms of the present disclosure will be described in detail with reference to the accompanying drawings.

The functional blocks illustrated in the drawings and described below are only examples of possible implementations. Other functional blocks may be used in other implementations without departing from the spirit and scope of the detailed description. Further, while one or more functional blocks of the present disclosure are represented by the respective blocks, one or more of the functional blocks of the present disclosure may be a combination of various hardware and software configurations that execute the same function.

Further, the expression of including certain components merely refers to the presence of the corresponding components as an open expression, and should not be understood as excluding additional components.

Further, when a component is said to be connected or accessed to another component, it should be understood that there may be a direct connection or access to another component, but there may exist other components therebetween.

Throughout the specification, when a part is said to be "connected" with another part, this includes not only the case of being "directly connected" but also the case of being "electrically connected" with another element interposed therebetween. Further, when a part is said to "include" a certain component, this means that it may further include other components rather than excluding other components unless specially stated otherwise.

Figure 2:
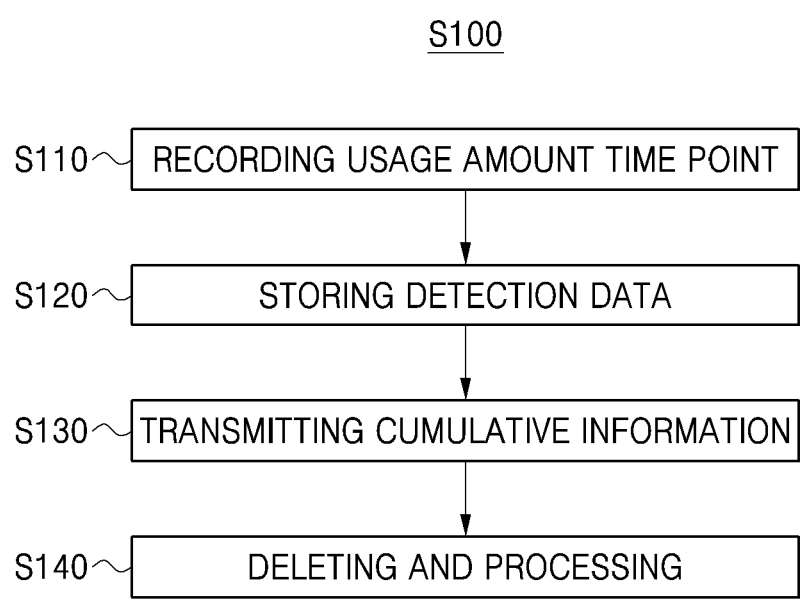
FIG. 2 is a flowchart illustrating a usage amount monitoring method of an electronic control unit for a vehicle in one form of the present disclosure.
Figure 3:
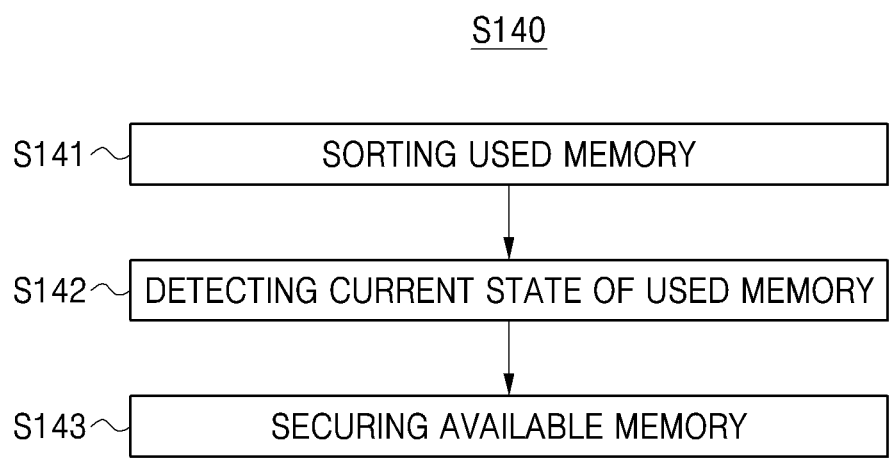
FIG. 3 is a flowchart illustrating a usage amount monitoring method of an electronic control unit for a vehicle in one form of the present disclosure.

FIG. 1 is a block diagram illustrating a usage amount monitoring unit of an electronic control unit for a vehicle in some forms of the present disclosure, FIG. 2 is a flowchart illustrating a usage amount monitoring method of an electronic control unit for a vehicle in some forms of the present disclosure, FIG. 3 is a flowchart illustrating a performing operation of the deleting and processing (operation S140) in some forms of the present disclosure, and FIG. 4 is a flowchart illustrating a usage amount monitoring method of an electronic control unit for a vehicle in some forms of the present disclosure.

Referring to these drawings, a usage amount monitoring method of an electronic control unit for a vehicle (operation S100) in some forms of the present disclosure may be a configuration of including recording a usage amount time point (operation S110), storing detection data (operation S120), and transmitting cumulative information (operation S130), which perform a specific process.

The usage amount monitoring method of the electronic control unit for the vehicle (operation S100) in some forms of the present disclosure may provide the usage amount monitoring method of the electronic control unit for the vehicle, which may include the recording the usage amount time point (operation S110), the storing the detection data (operation S120), and the transmitting the cumulative information (operation S130), which perform the specific process, to monitor the usage amount of the central processing unit mounted in the electronic control unit for the vehicle, thereby implementing an optimal operating state.

Hereinafter, each operation of configuring the usage amount monitoring method of the electronic control unit for the vehicle (operation S100) in some forms of the present disclosure will be described in detail with reference to the drawings.

In order to apply the usage amount monitoring method of the electronic control unit for the vehicle (operation S100) in some forms of the present disclosure, a usage amount monitoring unit 100 illustrated in FIG. 1 is required.

The usage amount monitoring unit 100 may be a configuration of including a Task and ISR execution time measuring unit 110, a software operation information obtaining unit 120, and a central processing unit usage amount measuring unit 130.

In general, when sensing an interrupt, a microprocessor stops a machine code being currently executed and jumps to a processing program for the corresponding interrupt to perform the corresponding task. At this time, a routine for processing the interrupt is called an Interrupt Service Routine (ISR). The interrupt is mainly inputted to a CPU core by hardware, and executes if the machine code being currently executing ends. When the interrupt is received, whether to handle the interrupt is optionally received in a special register of the CPU core through a bit. That is, the Task and ISR execution time measuring unit 110 in some forms of the present disclosure may measure the time required for the routine for processing the corresponding interrupt of the microprocessor.

Meanwhile, the Task and ISR execution time measuring unit 110 in some forms of the present disclosure is a configuration of recording the maximum usage amount update moment of the central processing unit (CPU) through the execution time measuring function of each Task and ISR by recording the time information of the Task and ISR execution and end time point.

The software operation information obtaining unit 120 is a configuration of storing them in a non-volatile memory by obtaining the maximum usage amount of the central processing unit (CPU), an engine RPM, a software operating mode, a fault code, the number executed of Tasks, and Task response time information.

Further, the central processing unit usage amount measuring unit 130 is a configuration of calculating the usage amount of the central processing unit based on the data obtained from the Task and the ISR execution time measuring unit and the software operation information obtaining unit.

In some cases, as illustrated in FIG. 1, the usage amount monitoring unit 100 in some forms of the present disclosure may be a configuration of further including an information recording and reproducing unit 140.

At this time, the information recording and reproducing unit 140 in some forms of the present disclosure is a configuration of sorting software and data occupying the memory of the central processing unit sequentially according to an occupying memory capability, then detecting whether the corresponding software or data is currently being used, is not being used after having been used in the past, and is expected to be used in the future, and deleting and processing the corresponding software and data that occupy the memory unnecessarily, based on the data stored from the storing the detection data.

Therefore, according to the usage amount monitoring unit 100 of the electronic control unit for the vehicle in some forms of the present disclosure, it is possible to provide the usage amount monitoring unit of the electronic control unit for the vehicle, which may include the Task and ISR execution time measuring unit 110, the software operation information obtaining unit 120, the central processing unit usage amount measuring unit 130, and the information recording and reproducing unit 140, which perform a specific role, to monitor the usage amount of the central processing unit mounted in the electronic control unit for the vehicle, thereby implementing the optimal operating state.

Hereinafter, a method for monitoring the usage amount of the electronic control unit for the vehicle (operation S100) by using the usage amount monitoring unit 100 of the electronic control unit for the vehicle described above will be described in detail.

As described above, the usage amount monitoring method of the electronic control unit for the vehicle (operation S100) in some forms of the present disclosure is a configuration of including the recording the usage amount time point (operation S110), the storing the detection data (operation S120), and the transmitting the cumulative information (operation S130), which perform the specific role.

The recording the usage amount time point (operation S110) is an operation of recording the maximum usage amount update moment of the central processing unit (CPU) through the execution time measuring function of each Task and ISR by recording the time information of the Task and ISR execution and end time point.

The storing the detection data (operation S120) is an operation of storing them in the non-volatile memory by obtaining the maximum usage amount of the central processing unit (CPU), the engine RPM, the software operating mode, the fault code, the number executed of Tasks, and the Task response time information.

The transmitting the cumulative information (operation S130) is an operation of transmitting relevant information to external communication so that the corresponding information may be confirmed in a PC in chronological order after storing the previous record in chronological order at the moment that the maximum usage amount of the central processing unit (CPU) is updated.

In some cases, as illustrated in FIG. 2, the usage amount monitoring method of the electronic control unit for the vehicle (operation S100) in some forms of the present disclosure may be a configuration of further including deleting and processing (operation S140).

As illustrated in FIG. 3, the deleting and processing (operation S140) may be performed by sequentially performing sorting a used memory (operation S141), detecting a current state of the used memory (operation S142), and securing an available memory (operation S143).

Specifically, the deleting and processing (operation S140) is an operation of sorting software and data occupying the memory of the central processing unit sequentially according to an occupying memory capability, then detecting whether the corresponding software or data is currently being used, is not being used after having been used in the past, or is expected to be used in the future, and deleting and processing the corresponding software and data that occupy the memory unnecessarily, based on the data stored from the storing the detection data (operation S120).

Explaining each operation of constituting the deleting and processing (operation S140) in detail, the sorting the used memory (operation S141) is an operation of sorting the software and data occupying the memory of the central processing unit sequentially according to the occupying memory capability.

The detecting the current state of the used memory (operation S142) is an operation of detecting whether the corresponding software or data is currently being used, is not being used after having been used in the past, or is expected to be used in the future, based on the data sorted sequentially from the sorting the used memory (operation S141).

The securing the available memory (operation S143) is an operation of deleting and processing the corresponding software or data according to a predetermined reference, based on the data detected from the detecting the current state of the used memory (operation S142).

At this time, the above-described predetermined reference is a reference of determining the level of the object to be deleted and processed, and is preferably a reference of determining whether to delete information of the memory that is not being used after having been used in the past or to delete information of the memory that is expected to be used in the future. Further, the predetermined reference may be preferably changed by a vehicle designer, a checker, or a user.

In some cases, as illustrated in FIG. 4, after the deleting and processing (operation S140) has been performed, the storing the deleted memory log (operation S144) that records the corresponding software and data information deleted and processed from the deleting and processing in chronological order may be performed. Thereafter, based on the data stored from the storing the deleted memory log (operation S144), if the corresponding software and data occupy the memory again, the deleting instantly (operation S145) that deletes and processes the information of the corresponding memory instantly may be performed.

As described above, according to the usage amount monitoring method of the electronic control unit for the vehicle according to the present disclosure, it is possible to provide the usage amount monitoring method of the electronic control unit for the vehicle, which may include the recording the usage amount time point, the storing the detection data, and the transmitting the cumulative information of the specific configuration to monitor the usage amount of the central processing unit mounted in the electronic control unit for the vehicle, thereby implementing the optimal operating state.

Further, according to the usage amount monitoring method of the electronic control unit for the vehicle according to the present disclosure, it is possible to include the sorting the used memory, the detecting the current state of the used memory, and the securing the available memory, which perform the specific role, to delete the software or data that wastes the memory of the central processing unit unnecessarily to sufficiently secure the available memory capability of the central processing unit, thereby significantly enhancing the response performance of the electronic control unit, and as a result, ensuring the safe control operation of the vehicle.

Further, according to the usage amount monitoring method of the electronic control unit for the vehicle according to the present disclosure, it is possible to include the deleting and processing, the storing the deleted memory log, and the deleting instantly, which perform the specific role, to delete the software or data that wastes the memory of the central processing unit unnecessarily to sufficiently secure the available memory capability of the central processing unit, thereby significantly enhancing the response performance of the electronic control unit, and as a result, ensuring the safe control operation of the vehicle.

As described above, according to the usage amount monitoring unit of the electronic control unit for the vehicle according to the present disclosure, it is possible to provide the usage amount monitoring unit of the electronic control unit for the vehicle, which may include the Task and ISR execution time measuring unit, the software operation information obtaining unit, the central processing unit usage amount measuring unit, and the information recording and reproducing unit, which perform the specific role, to monitor the usage amount of the central processing unit mounted in the electronic control unit for the vehicle, thereby implementing the optimal operating state.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for monitoring a usage amount of a Central Processing Unit (CPU) mounted in an Electronic Control Unit (ECU) for a vehicle by using a usage amount monitoring unit, the usage amount monitoring unit comprising:
   a Task and interrupt service routine (ISR) execution time measuring unit configured to record a maximum usage amount update moment of the CPU through an execution time measuring function of each Task and ISR by recording time information of a Task and ISR execution and an end time point;
   a software operation information obtaining unit configured to store detection data in a non-volatile memory by obtaining a maximum usage amount of the CPU, an engine revolutions per minute (RPM), a software operating mode, a fault code, a number of executed Tasks, and Task response time information; and
   a central processing unit usage amount measuring unit configured to calculate the usage amount of the CPU based on the data obtained from the Task and ISR execution time measuring unit and the software operation information obtaining unit;
   the method comprising:
      recording, by the Task and ISR execution time measuring unit, a usage amount time that records the maximum usage amount of the CPU by recording a start time and an end time of a Task and ISR;
      storing, by the software operation information obtaining unit, data in the non-volatile memory by obtaining the maximum usage amount of the CPU, the engine RPM, the software operating mode, the fault code, the number of Tasks started, and a Task response time; and
      transmitting, by the central processing unit usage amount measuring unit, relevant information to an external communication and confirming the relevant information in a personal computer (PC) in a chronological order after storing a previous record in the chronological order in response to an update of the maximum usage amount of the CPU.

2. The method of claim 1, wherein the method further comprises:
   sorting a used memory that is sorted sequentially corresponding to a memory capacity of software and data, wherein the software uses a memory of the CPU.

3. The method of claim 2, wherein the method further comprises:
   detecting a current state of the used memory that determines whether the software or the data is currently used, whether the software or the data is not currently used after being used in the past, or whether the software or the data is expected to be used in the future, based on the sequentially sorted data.

4. The method of claim 3, wherein the method further comprises:
   securing an available memory that deletes the software or the data according to a predetermined reference, based on the detected the current state of the used memory.

5. The method of claim 4, wherein the method comprises:
   determining whether to delete the memory that is not currently used after being used in the past, or the memory that is expected to be used in the future, wherein the predetermined reference is a reference for determining a level of an object to be deleted.

6. The method of claim 4, wherein the predetermined reference may be changed by a vehicle designer, a checker, or a user.

7. The method of claim 1, wherein the method further comprises:
   sorting the software and the data sequentially according to a memory capacity;
   determining whether the software or the data is currently used, is not currently used after being used in the past, or is expected to be used in the future; and
   deleting the software and the data that occupy the memory unnecessarily based on the stored data.

8. The method of claim 7, wherein the method further comprises:
   storing a deleted memory log that records the deleted software and the deleted data in a chronological order.

9. The method of claim 8, wherein the method further comprises:
   when the software and the data use the memory again, deleting instantly the memory based on the stored data.

10. The method of claim 1, wherein the method further comprises:
   calculating the usage amount of the CPU based on the maximum usage amount of the CPU, the RPM, the software operating mode, the fault code, the number of Tasks started, and the Task response time.

* * * * *